United States Patent [19]

Breeden

[11] Patent Number: 4,540,128
[45] Date of Patent: Sep. 10, 1985

[54] LOCK FOR FOOD PUSHER IN FEED TUBE PROTECTOR OF A FOOD PROCESSOR

[75] Inventor: John W. Breeden, Westport, Conn.

[73] Assignee: Cuisinarts, Inc., Greenwich, Conn.

[21] Appl. No.: 542,340

[22] Filed: Oct. 24, 1983

[51] Int. Cl.³ .............................................. B02L 18/12
[52] U.S. Cl. .................................. 241/37.5; 241/282.1
[58] Field of Search ............... 241/36, 37.5, 92, 282.1, 241/282.2, 199.12

[56] References Cited

U.S. PATENT DOCUMENTS 2,169,323  8/1939  Martinet .................................. 241/92
4,226,373 10/1980  Williams .............................. 241/37.5

Primary Examiner—Howard N. Goldberg
Assistant Examiner—Timothy V. Eley
Attorney, Agent, or Firm—Parmelee, Bollinger & Bramblett

[57] ABSTRACT

Lock for the food pusher in a feedtube protector of a food processor. The feedtube protector has an outer sleeve nestable in a predetermined position around the exterior of the feedtube with a first food pusher captured in telescoping relationship within the outer sleeve for enabling the captured food pusher to move up and down therein. This first food pusher is in alignment with the interior of the outer sleeve for causing the first food pusher to become aligned with a first larger food passageway in the feedtube only when the outer sleeve is nested around the feedtube. This first food pusher has a second smaller food passageway within itself adapted to receive a removable second food pusher plungable into this second food passageway for pushing smaller food items down into the bowl toward a rotating tool in the bowl. This second passageway is smaller than the first passageway for convenient processing of smaller food items without removing the feedtube protector from the food processor. To prevent the larger first food pusher from elevating and defeating operation of the smaller second food pusher, a manually operable horizontally movable locking mechanism on the outer sleeve prevents relative movement between first food pusher and the outer sleeve when the smaller second food pusher is being employed. Either the larger or the smaller food pusher may be locked when the other is being used.

6 Claims, 7 Drawing Figures

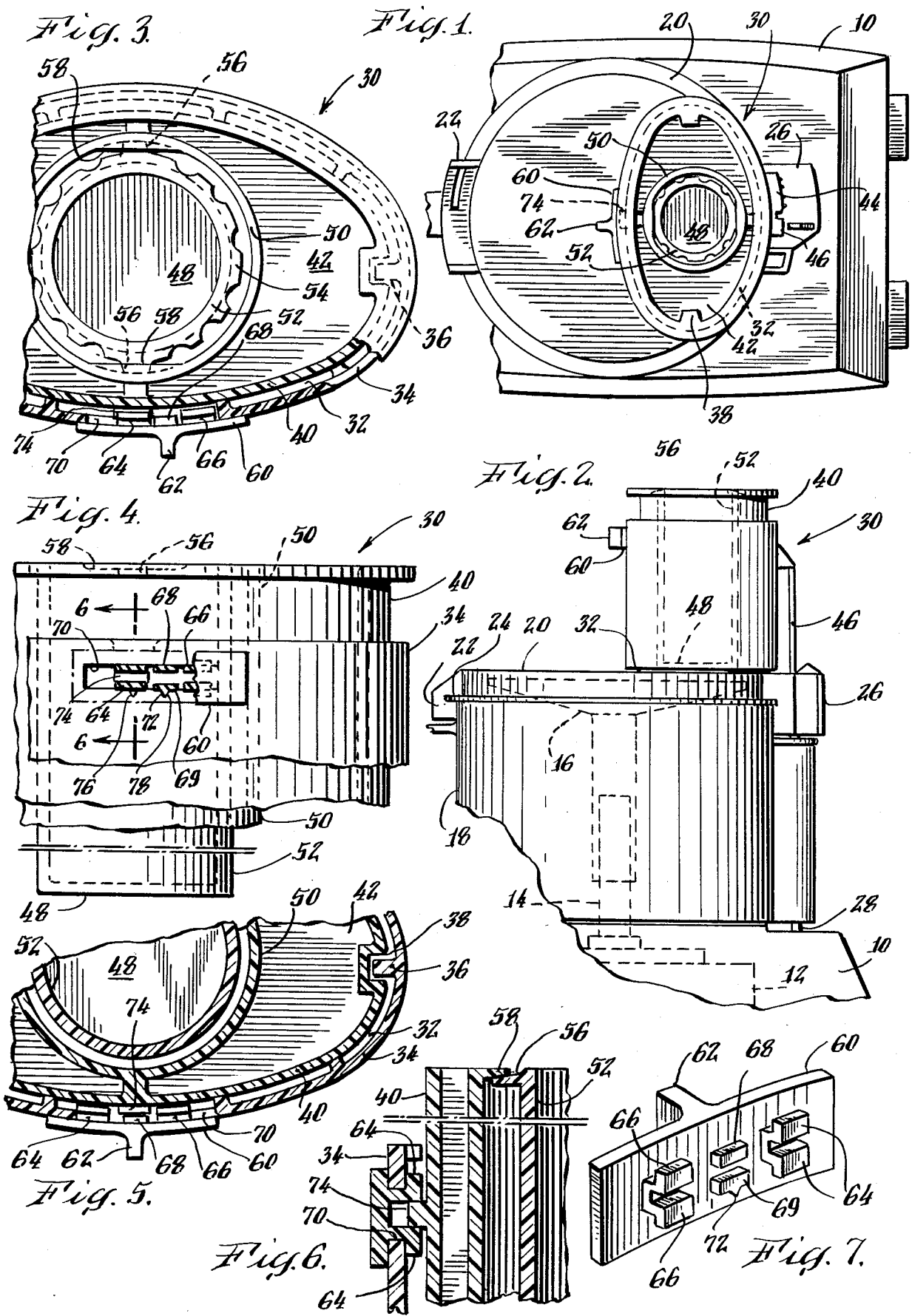

LOCK FOR FOOD PUSHER IN FEED TUBE PROTECTOR OF A FOOD PROCESSOR

BACKGROUND OF THE INVENTION

This invention relates to feedtube protectors for food processors, and more particularly to such protectors which employ first and second food passageways and first and second food pushers each of which may be locked while the other is in use in order to enable the use of a plurality of different size food passageways in a protector which must be properly positioned on the food processor to enable the food processor to operate for protecting the user and the food processor from injury.

Food processors of the type to which the present invention is applicable have a working bowl with a motor driven shaft projecting upwards into the bowl on which various selected rotary food processing tools can be engaged to be driven by the shaft for performing various food processing operations in accordance with the desires of the user. A detatchable cover is secured over the top of the bowl during use. The cover includes a feedtube having a mouth that opens downwardly through the cover into the top of the bowl. The food items to be processed are placed in this feedtube and are then manually pushed down through the feedtube into the bowl by means of a removable food pusher which is adapted to slide down in the manner of a plunger through the feedtube. Further information with respect to such food processors may be obtained by reference to U.S. Pat. Nos. 3,892,365—Verdun; 3,985,304—Sontheimer; and 4,127,342—Coggiola.

The rotary tools used in food processors are driven by relatively poweful motor drive arrangements and have the capability of causing injury to a finger or hand if the user could inadvertently bring a hand into contact with the motor driven tool. For this reason, a bowl safety cover feature is incorporated into these units which requires that the cover be firmly locked onto the bowl in normal operating position before the motor will operate. This requirement is achieved by making the cover which locks rotationally to the bowl with a projection or member which causes the closing of the switch carried in the housing only when the cover is properly locked in its normal operating position on the bowl. However, this still may not prevent injury to the hand if it were inserted down through the feedtube large enough to accommodate receipt of a hand. Accordingly, the feedtube is deliberately designed in terms of shape, cross section and height, i.e. it is relatively tall and narrow, to make it impossible for an adult to inadvertently insert the hand sufficiently down into the feedtube to touch the rotating tool located in the upper portion of the working bowl. In addition, a food pusher is provided which is insertable into the feedtube for feeding the food items down into engagement with the food processing tool.

The size and shape limitations of the feedtube were overcome by U.S. Pat. No. 4,226,373 to James Williams while maintaining the safety features by providing a feedtube protector the form of an outer sleeve which carries an actuator for enabling the machine operation only when the sleeve is properly positioned over the feedtube. This sleeve has associated therewith a movable food pusher captured by the sleeve and mounted for movement within the sleeve. When the cover is positioned on the bowl and this sleeve is mounted over the feedtube, the food pusher is manually movable within the passageway in the feedtube, and the acutator on the sleeve is operatively associated with the control means of the food processor to permit operation of the motor drive. Accordingly, inadvertent insertion of a hand or a foreign object into the feedtube is prevented when the tool is being driven. By virtue of the arrangement described in Williams, the feedtube can be safely shortened and have a larger cross-sectional area so that large items can be inserted whole into the feedtube.

In Williams application Ser. No. 500,327 entitled SINGLE VERTICAL MOTION FEEDTUBE PROTECTOR AND ACTUATOR FOR A FOOD PROCESSOR, the loading of the feedtube protector described in the aforesaid U.S. patent to Williams is enhanced in enabling a single upward or downward motion of the feedtube protector when properly aligned on the feedtube to actuate the motor drive of the food processor. As will be apparent with a food pusher which is captivated and completely blocks the feedtube when the outer sleeve is positioned thereon, the feedtube protector must be removed to load the feedtube. In some cases, for example, for processing narrow elongated food items such as carrots, cucumbers, pepperoni, celery, zucchini etc., a smaller feedtube is provided inside the larger captivated food pusher, with the smaller feedtube having dimensions and proportions which would prevent the entry of the hand therein i.e., a long narrow passageway in cylindrical form. Thus, a separate food pusher is provided for the second smaller passageway which is operated without removing the outer sleeve from operative engagement with the control means of the food processor. However, when utilizing a food pusher in the second or smaller food passageway, the pushing of food down toward the operating blade could put pressure on the underside of the larger captivated food pusher thereby elevating the captivated food pusher and allowing the food which is to be processed to ride up above the rotating blade and into the larger feedtube passage without being processed and/or injected into the bowl. Accordingly, it would be desirable to lock the captivated food pusher to the outer sleeve when it is not in use, so that the small food pusher and the food processor would function properly when the smaller feedtube is being used.

SUMMARY

Accordingly, it is an object of this invention to provide a new and improved food processor which permits the use of multiple feedtube passageways while maintaining the safety features of preventing operation of the food processor by the user unless the cover is locked in place and properly installed on the working bowl and unless the feedtube protector is properly positioned over the feedtube.

A further object of this invention is to provide a new and improved feedtube protector for a food processor which enables the use of a smaller feedtube passageway in a larger captivated feedtube passage utilizing food pushers which when either is in operation does not interfere nor substantially affect the food processing process.

Still another object of this invention is to provide a new and improved feedtube protector for a food processor with suitable safety features which do not restrict the size, shape and overall dimensions of the food processor and permit the use of a smaller food passageway without stopping the operation of the food processor.

In carrying out this invention in one illustrative embodiment thereof, a feedtube protector is provided for a food processor of the type including a housing containing an electric motor drive and control means for rendering the motor drive inoperative unless the control means is actuated. A bowl is mounted on the housing for encircling a rotatable tool within the bowl drivable by the tool drive means when the motor drive is rendered operative by actuation of the control means. A removable cover is adapted to be positioned on the bowl with a feedtube mounted on the cover forming a first food passageway for feeding food items through the cover of the bowl and in which a food pusher can be plunged into the first food passageway for pushing the food items toward the rotating tool. A locking means is provided for the feedtube protector which has an outer sleeve nestable in a predetermined position around the exterior of the feedtube with the food pusher being captured in telescoping relationship with respect to the outer sleeve for enabling the captured food pusher to move longitudinally within the outer sleeve and in the first food passageway when and only when the outer sleeve is nested around and in proper position on the feedtube. The captured food pusher has a second food passageway for feeding food items through the cover into the bowl and is adapted to receive a removable food pusher which can be plunged into the second food passageway for pushing the food items toward the rotating tool with the second food passageway as well as its removable food pusher being smaller than the first food passageway and its captured food pusher. Locking means are provided for preventing relative movement between the captured food pusher and the outer sleeve to prevent the captured food pusher from being elevated when food items are being fed through the second food passageway and are pushed downwardly therein by the removable food pusher.

In one form the locking means may comprise an actuating member movably horizontally into first and second positions on the outer sleeve, and includes a cooperating engagement member positioned on the captured food pusher which in a first position of the actuating means on the outer sleeve locks the food pusher into engagement with the outer sleeve and when the actuating member is released to a second position to allow the movement of the captured food pusher in the outer sleeve. The second food pusher may also be provided with a locking means in theform of ears which extend into opposed openings on the side walls of the captured food pusher.

It is among the many advantages of a food processor embodying this invention that both a larger and a smaller food passageway may be employed for feeding different size items onto the rotating tool for processing and that these passageways which employ larger and smaller food pushers respectively, may be operated without their functions being derogated by locking the food pusher which is not being used into engagement such that it does not interfere with the food processing operation being carried on in the other food passageway with its associated food pusher.

BRIEF DESCRIPTION OF THE DRAWINGS

The invention, together with further features, objects, aspects and advantages thereof will be more clearly understood from the following description taken in conjunction with the accompanying drawings in which like reference numerals are used to refer to corresponding elements throughout the various views.

FIG. 1 is a partial top view of a food processor having a feedtube protector incorporating the present invention positioned thereon.

FIG. 2 is a partial side view of FIG. 1.

FIG. 3 is an enlarged partial top view partly in section of a feedtube protector incorporating the present invention.

FIG. 4 is an enlarged front elevational view of FIG. 3.

FIG. 5 is a cross-sectional view illustrating the horizontal locking mechanism embodying the present invention.

FIG. 6 is a cross-sectional view taken along line 6—6 of FIG. 4.

FIG. 7 is a perspective view of the actuating element of the horizontal lock of an illustrative embodiment in accordance with the present invention.

DESCRIPTION OF THE PREFERRED EMBODIMENTS

Referring now to FIGS. 1 and 2, a food processor is illustrated having a base housing 10 containing an electric motor 12 which may be energized in a conventional manner as more fully shown and described in the Verdun Patent cited above. A vertical drive shaft 14 extends upward from the base housing 10 and is driven by the electric motor 12. A variety of different types of food processing tools, one of which is illustrated at 16, are provided which may be selectively mounted on the drive shaft 14 for rotation therewith. A work bowl 18 is mountable on the housing 10 surrounding the drive shaft 14 and the rotary tool 16 mounted thereon such that the drive shaft 14 with the rotary tool attached thereto rotates within the bowl 18. The top of the bowl 18 is closed with a cover 20 which is arranged to be engaged in a locked relationship in its normal operating position on the bowl 18 whenever the food processor is in operation. The cover 20 may be held in locked engagement with the bowl in a conventional manner by placing the cover on the rim of the bowl and turning the cover to obtain a twist lock effect. This locking engagement is illustrated in FIG. 2 by providing the cover 20 with a plurality of circumferentially located depending lugs 22 which upon the rotation of the cover 20 engage underneath a plurality of cooperating radial ledges 24 on the bowl 18 near its rim. The cover 20 also carries an actuator housing 26 which when the cover is locked in normal operating position on the bowl 18 overlies an operating rod 28 in a manner more fully described in the aforesaid Williams application. As will be explained hereinafter although the present invention is particularly useful with the type of one motion vertical actuation and deactuation of the food processor, it will also be useful in those applications where the feedtube protector is in accordance with the aforesaid Williams patent or application in the situation where the feedtube protector is inserted on and turned with the cover to properly lock and position the cover and feedtube protector on the bowl and actuate the food processor The feedtube 32 extends upwardly from the cover 20 defining a passageway therethrough which extends downwardly through the cover 20 providing an opening therethrough which overlies the rotary tools 16 in the work bowl 18. It will be noted for example, in FIGS. 1 and 3, that the feedtube 32 has an elongated oval shape which is adapted to accommodate the processing of large food articles. Accordingly, a feedtube protector 30 as is best illustrated in FIG. 3-5, is provided in accordance with the teachings of the Williams patent referred to above to accommodate the use of such a large opening feedtube while preserving the safety feature of preventing the operation of the food processor unless the feedtube protector is properly positioned and installed on the feedtube. The feedtube protector 30 includes an outer sleeve which has the same general configuration as, but slightly larger than, the feedtube 32 over which it is adapted to telescope in close fitting but easily slidable relationship. Near the top edge of the outer sleeve 34 are a plurality of guide means 36 in the form of inwardly projecting elements, for example, ridges, lugs or splines, rigidly secured to the outer sleeve 34 on which a first or large food pusher 40 is slidably mounted in captivated relationship. The large food pusher 40 has the same general configuration as, but is slightly smaller than the feedtube 32 in which it is adapted to be aligned and plunged downwardly therethrough in order to force food items which have been placed in the feedtube 32 onto the rotary tool 16 for processing.

The food pusher 40 has a plurality of longitudinally extending guideways 38 therein which are engaged in sliding relationship with the respective guide means 36. These longitudinal guideways 38, may for example, be in the form of molded channels, grooves or splineways extending along the outside surface of the food pusher 40, or these longitudinal guideways may for example, be in the form of slots in the sides of the pusher. The longitudinal guideways 38 extend down from near the top of the pusher 40 to a bottom 42 with the guideways terminating in the bottom 42 and thus since they are not open on either end serve as stops to limit either the upward or downward movement of the captivated food pusher 40.

The outer sleeve 34 of the feedtube protector 30 carries a latching leg 44 and an actuator leg 46 (see FIGS. 1 and 2) which when the feedtube protector 30 is properly positioned and nested on the feedtube 32 when the cover 20 is secured in proper position on the bowl 18, the legs 44 and 46 extend into the actuator housing 26 for actuating and turning on the food processor as shown and described for example, in the aforesaid Williams application. With such an arrangement the feedtube protector 30 in effect operates as a switch to turn the food processor on or off by a single vertical downward or upward movement, respectively, for controlling the operation of the food processor. Such structure which is described in detail in the aforesaid Williams application forms no part of the present invention and accordingly, is not discussed herein in detail.

With the single vertical movement operating mechanism referred to above, it becomes necessary to remove the feedtube protector 30 before the loading of the feedtube may take place. Then the outer sleeve is telescoped over the feedtube 32 thereby aligning the food pusher 40 in the feedtube 32 which may be plunged downwardly therein to feed food items to the rotary tool 16.

Those situations where it is desirable to process food items of considerably smaller dimensions, and the cut or processing is to be made through the smaller dimensions of the food item, for example, a carrot which is to be sliced horizontally in disc form, would require a much smaller feedtube than the size and shape of the feedtube 32. Such a problem is solved by providing a considerably smaller feedtube 50 centrally in the first or larger feedtube 32 in the form of a cylinder which extends completely therethrough. The smaller feedtube 50 has its own smaller removable food pusher 52 which is capable of being plunged downwardly therein to push food items which have been deposited therein onto the rotary tool 16. The removable food pusher 52 has a fluted rim or flange 54 thereon (see FIG. 3) and diametrically opposed ears 56 extending therefrom. The fluted rim allows for gripping and the ears 56 cooperate with complementary slots 58 located on opposite sides of the periphery of the larger food pusher 40 for locking the smaller food pusher in position in the larger one when the smaller food pusher 52 is inserted into the larger food pusher 40 and rotated until the ears 56 enter and engage the slots 58. The smaller food pusher 52 has a closed bottom 48 which is aligned in the same plane with the bottom 42 of the larger food pusher 40 when the smaller food pusher is locked in the larger one. This provides a large flat bottom for the large food pusher and limits access from the bottom to the feedtube 32 which allows the larger feedtube to apply equal pressure on the food items applied or fed through the feedtube 32 to be pushed by the food pusher onto the rotary tool 16.

The problem however, is encountered when the larger food pusher 40 is not being used. One of the benefits of the smaller feedtube 50 and its accompanying smaller removable food pusher 52 is the fact that the entire feedtube protector 30 does not have to be removed when using the smaller feedtube 50. However, in such an arrangement with food items being fed through the smaller feedtube, if the food items are allowed to elevate or enter the larger feedtube 32 from the bottom because of the elevation of the captivated food pusher 40 then the purpose of the protector is being defeated. Either sliced or unsliced food may find its way into the larger feedtube 32 either before or after processing which would clog the machine and make for uneven cuts. This situation is alleviated by the present invention in providing locking means on the outer sleeve 34 which cooperates and engages engagement means on the captivated food pusher 40 for immobilizing or preventing relative movement between the outer sleeve and the captivated food pusher 40 in a first position and releasing the captivated food pusher in a second position so that it may be utilized when the larger feedtube is being used to apply food items to the rotary tool 16.

This locking means includes a slide 60 having an operating button 62 thereon and on the opposite side thereof two pairs of spaced cooperating feet 64 and 66 and a pair of guides 68 and 69 in alignment therewith. Guide 69 has a projection 72 extending downwardly thereon. The slide 60 is adapted to slidably move in a rectangular slot 70 in the outer sleeve 34. The movement is in a horizontal line defined by the aligned pairs of feet 64 and 66 and the intermediate guides 68 and 69 therebetween. A projection or detent 74 mounted on an exterior surface of the larger food pusher 40 is adapted to slide between and engage one set of feet 64 on the underside of the slide 60 at the same time the detent 72 engages a first notch 78 in the slot 70. When this occurs, the slide is in a first locked position. This locked position is illustrated in FIG. 3, 4 and 6 in which the projection 74 is positioned between the pair of feet 64 and the detent 72 is positioned in a second notch 76 when the slide is in a second unlocked position. FIG. 5 illustrates the slide in the unlocked position in which the larger food pusher 40 is free for captivated movement and plunging into the larger feedtube 32. In this second position the detent 72 on the slide 60 engages a second notch 76 in the slot 70. Accordingly, a very simple means is provided for locking the larger food pusher to the outer sleeve, freeing the use of the smaller feedtube 50 and its associated smaller food pusher 52 without undesirably elevating the larger food pusher 40.

The horizontal locking arrangement is convenient to use, is readily accessible and easy to operate while being very positive and having only two positions. The horizontal lock in accordance with the present invention facilitates the use of a small feedtube within a larger one which may utilize its own food pusher to permit the processing of elongated items such as carrots which are to be sliced horizontally in disc form. This operation may also be carried out without the removal of the feedtube protector 30 from the cover 20. Since the small feedtube is elongated and prevents the entry of the hand of the user, the safety features of the feedtube protector are not violated.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. In a food processor of the type including a housing containing an electric motor drive and control means for rendering said motor drive inoperative unless said control means is actuated, a bowl mountable on said housing for enclosing a rotatable tool within said bowl drivable by tool drive means when said motor drive is rendered operative by actuation of said control means, a removable cover adapted to be positioned on said bowl with a feedtube mounted on said cover forming a first food passageway for feeding food items through said cover into said bowl, and in which a food pusher can be plunged into said first food passageway for pushing food items toward the rotating tool, a locking means for a feedtube protector comprising:

an outer sleeve nestable in a predetermined position around the exterior of said feedtube;
    said food pusher being captured in telescoping relationship with respect to said outer sleeve for enabling said captured food pusher to move longitudinally within said outer sleeve;
    said captured food pusher being in alignment with the interior of said outer sleeve for causing said food pusher to become aligned with said first food passageway only when said outer sleeve is nested around said feedtube;
    said captured food pusher having a second food passageway for feeding food items through said cover into said bowl adapted to receive a removable food pusher which can be plunged into said second food passageway for pushing food items toward the rotating tool;
    said second food passageway being smaller than said first food passageway for accommodating the processing of smaller food items without removing the feedtube protector from the food processor;
    and manually movable locking means mounted on said outer sleeve engageable with said captured food pusher for positively preventing relative movement between said captured food pusher and said outer sleeve to prevent the captured food pusher from being elevated when food items are being fed down through said second food passageway and are being pushed downwardly therein by said removable food pusher.

2. In a food processor of the type including a housing containing an electric motor drive and control means for rendering said motor drive inoperative unless said control means is actuated, a bowl mountable on said housing for enclosing a rotatable tool within said bowl drivable by tool drive means when said motor drive is rendered operative by actuation of said control means, a removable cover adapted to be positioned on said bowl with a feedtube mounted on said cover forming a first food passageway for feeding food items through said cover into said bowl, and in which a food pusher can be plunged into said first food passageway for pushing food items toward the rotating tool, locking means for a feedtube protector comprising:

an outer sleeve nestable in a predetermined position around the exterior of said feedtube;
    said food pusher being captured in telescoping relationship with respect to said outer sleeve for enabling said captured food pusher to move longitudinally within said outer sleeve;
    said captured food pusher being in alignment with the interior of said outer sleeve for causing said food pusher to become aligned with said first food passageway only when said outer sleeve is nested around said feedtube;
    said captured food pusher having a second food passageway for feeding food items through said cover into said bowl adapted to receive a removable food pusher which can be plunged into said second food passageway for pushing food items toward the rotating tool;
    said second food passageway being smaller than said first food passageway for accommodating the processing of smaller food items without removing the feedtube protector from the food processor;
    locking means for preventing relative movement between said captured food pusher and said outer sleeve to prevent the captued food pusher from being elevated when food items are being fed through said second food passageway and are pushed downwardly therein by said removable food pusher, and
    said locking means including an actuating member movably mounted on said outer sleeve for movement to first and second positions and a cooperating engagement member positioned on said captured food pusher, said engagement member being engaged by said actuating member in said first position on said outer sleeve and released when said actuating member is in said second position on said outer sleeve to allow the movement of said captured food pusher in said outer sleeve when said actuating member is in said second position.

3. The structure claimed in claim 2 in which said actuating member is mounted for horizontal movement on said outer sleeve.

4. The structure claimed in claim 3 having a removable food pusher for use in said second food passageway which in a predetermined position is retained therein.

5. In a food processor, locking means for a feedtube protector as claimed in claim 2, in which:

said outer sleeve has a slot therein, said actuating member is a slide manually movable along said slot to first and second positions along said slot, said slide has at least one pair of spaced feet extending through said slot into the interior of said outer sleeve, and said engagement member becomes positioned between said feet when said slide is in said first position for locking said captured food pusher against movement relative to said outer sleeve.

6. In a food processor, locking means for a feedtube protector as claimed in claim 5, in which:

said slot extends horizontally in said outer sleeve, said slide has two pairs of spaced feet extending through said slot into the interior of said outer sleeve, said two pairs of spaced feet are disposed toward opposite ends of said slide, and said engagement member is free to move without interference between said two pairs of spaced feet when said slide is in said second position.

* * * * *